United States Patent [19]

Kornfeld

[11] Patent Number: 4,741,604
[45] Date of Patent: May 3, 1988

[54] ELECTRODE ARRAYS FOR CELLULAR DISPLAYS

[76] Inventor: Cary D. Kornfeld, 232 Mountain Ave., Murray Hill, N.J. 07974

[21] Appl. No.: 697,344

[22] Filed: Feb. 1, 1985

[51] Int. Cl.[4] .............................................. G02B 26/02
[52] U.S. Cl. .................................................... 350/362
[58] Field of Search ................. 350/362, 332; 204/209; 340/713, 763, 783, 787, 805

[56] References Cited

U.S. PATENT DOCUMENTS

| | | | |
|---|---|---|---|
| 3,657,091 | 4/1972 | Forest | 204/181 |
| 3,668,106 | 6/1972 | Ota | 204/299 |
| 4,068,927 | 1/1978 | White | 350/160 R |
| 4,071,430 | 1/1978 | Liebert | 204/299 R |
| 4,126,528 | 11/1978 | Chiang | 204/180 R |
| 4,187,160 | 2/1980 | Zimmermann | 204/180 R |
| 4,218,302 | 8/1980 | Dalisa et al. | 204/299 R |
| 4,241,344 | 12/1980 | Kmetz et al. | 350/332 |
| 4,285,801 | 8/1981 | Chiang | 204/299 R |

Primary Examiner—Bruce Y. Arnold

[57] ABSTRACT

An electric flat panel display has a matrix of flat panel display cells and a fault tolerant driver circuit and an electrode array. A folded field drive scheme applies a periodic voltage signal to a common electrode. Opposing electrodes are set to one of two voltage states by voltage setting circuits.

4 Claims, 3 Drawing Sheets

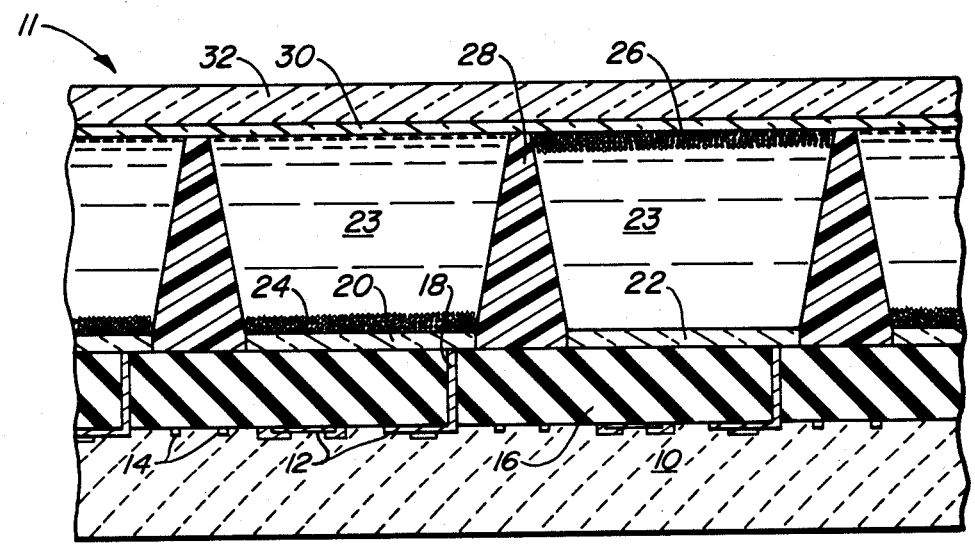
FIG._1.
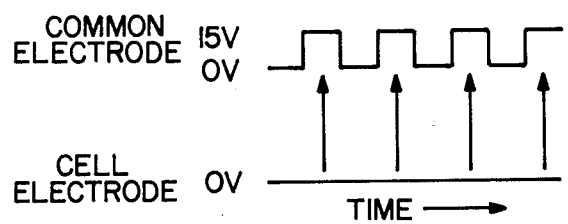
FIG._1A.
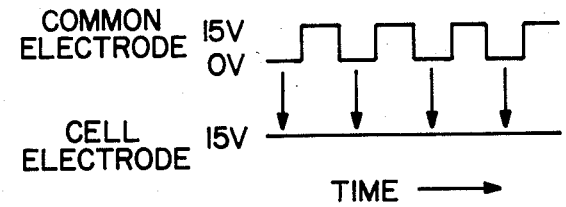
FIG._1B.
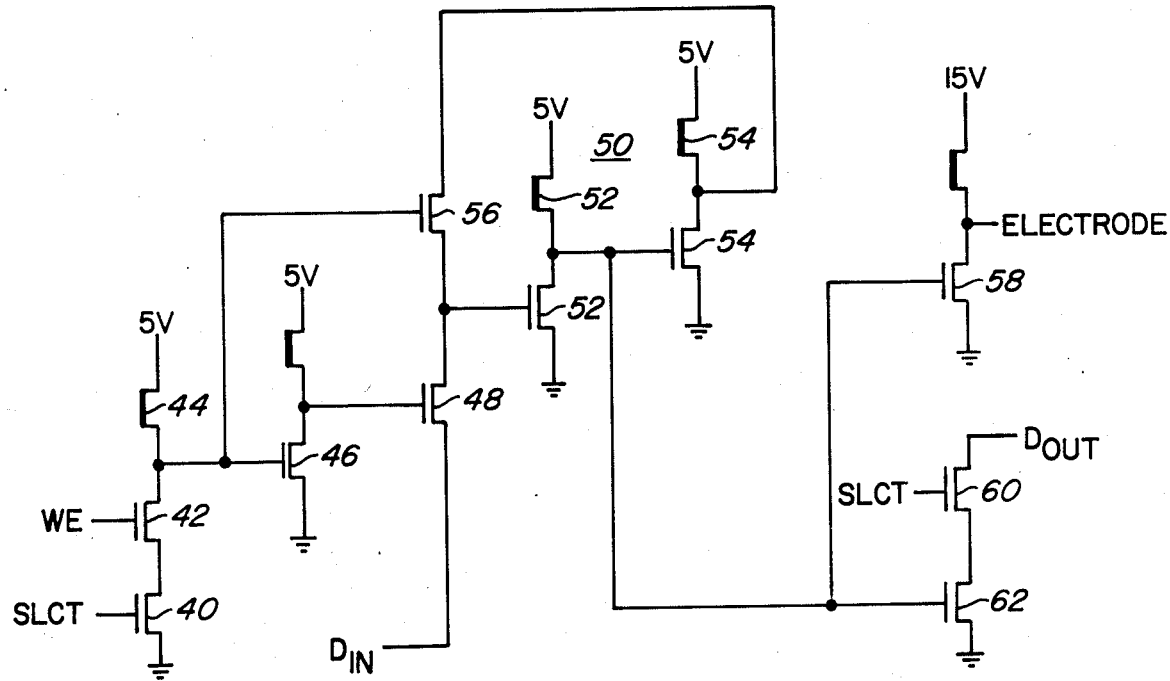
FIG._2.

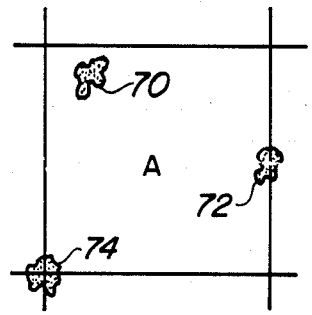
FIG._3A.
(PRIOR ART)
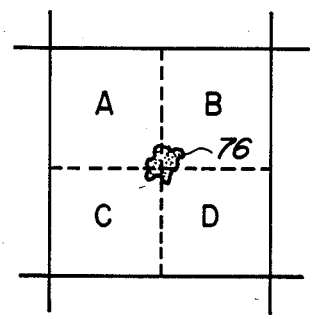
FIG._3B.
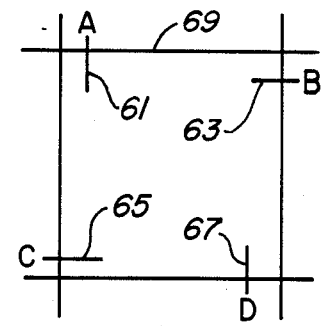
FIG._3C.
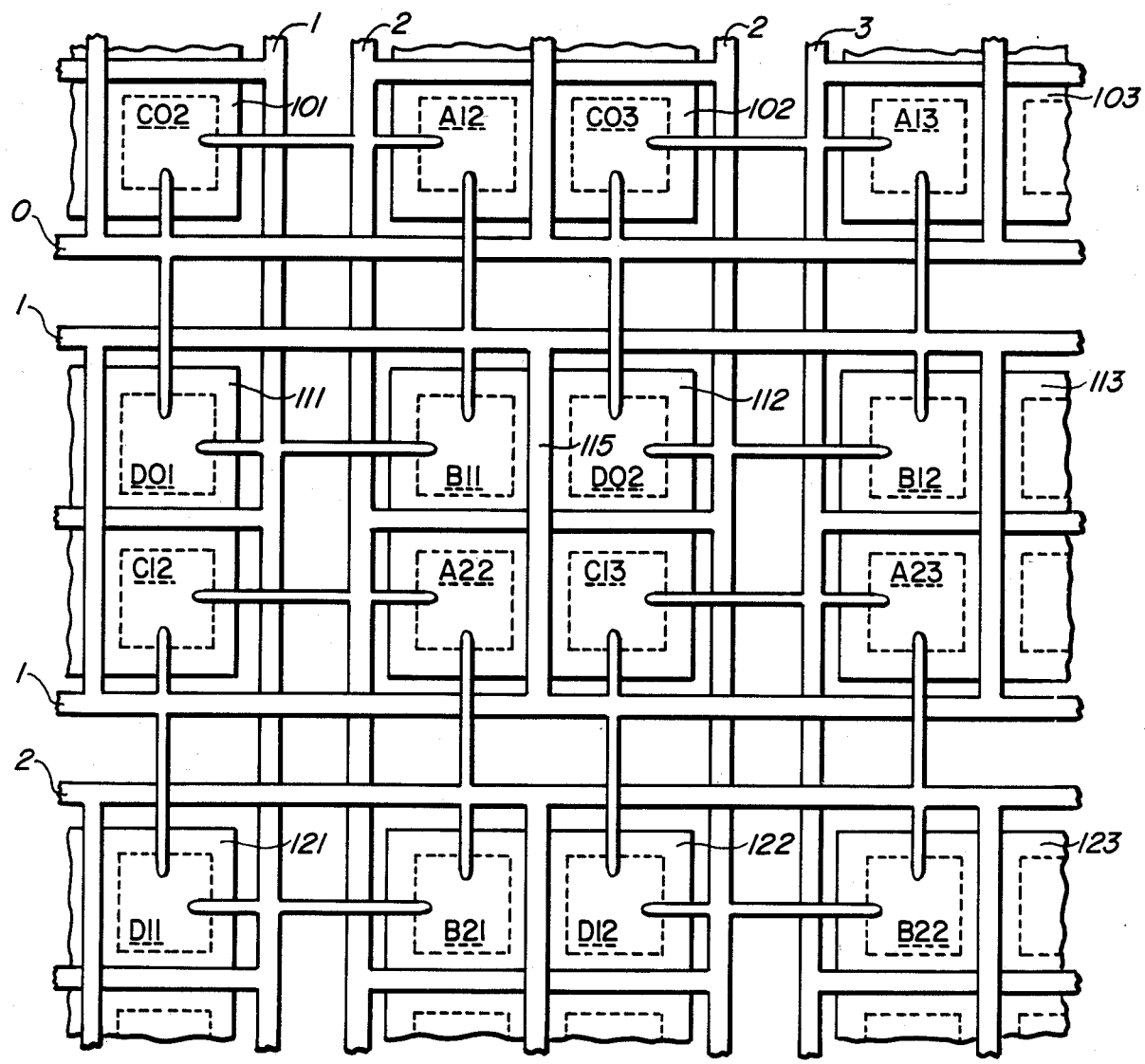
FIG._4.

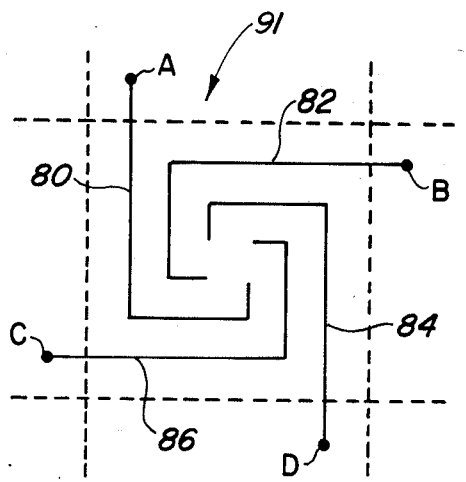
FIG._5A.
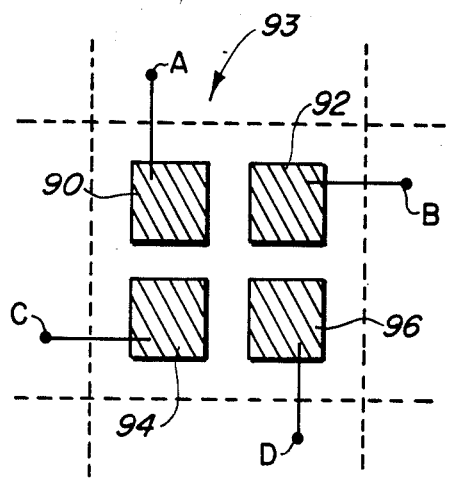
FIG._5B.
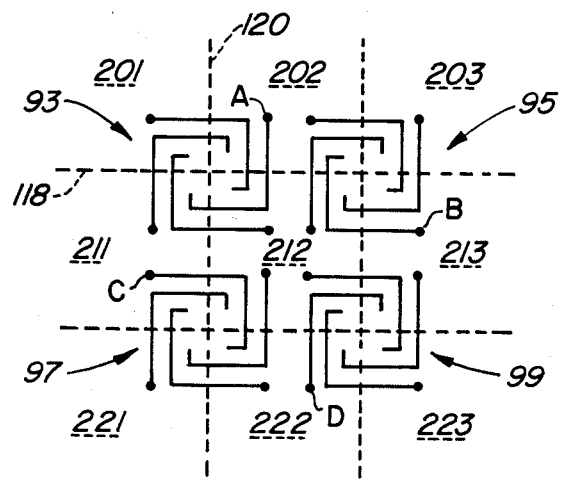
FIG._5C.
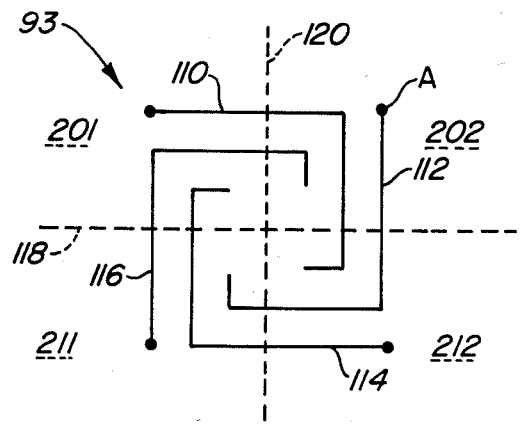
FIG._5D.

ELECTRODE ARRAYS FOR CELLULAR DISPLAYS

DESCRIPTION

1. Technical Field

The invention relates to cellular display devices and in particular to electrode arrays and methods for driving these displays.

2. Background Art

Ota, in U.S. Pat. No. 3,668,106, teaches the basic structure and operation of an electrophoretic (EP) display. The EP display is made of a matrix of cells, each cell being separated from adjacent cells by spacers. Within each cell, charged particles of one color are suspended in a liquid of another color. An electrode is positioned at the bottom of each cell, while a transparent electrode is positioned above the cells. An electric field is created between electrodes by applying a voltage between electrodes. The field changes the spatial distribution of the particles so that either the liquid color or the particle color is seen. Reversing the polarity of the field in a cell changes the color of the cell.

Many subsequent inventions have improved upon Ota's display. Chiang (U.S. Pat. Nos. 4,126,528 and 4,285,801) teaches improved particle compositions for EP cells. White (U.S. Pat. No. 4,068,927) teaches the use of buried lead lines separated from the suspension by an insulating layer. Dalisa et al. (U.S. Pat. No. 4,218,302) teaches a means for illuminating the display panel.

Zimmermann in U.S. Pat. No. 4,187,160, prevents agglomeration of particles by driving an EP cell with a modulated signal. This signal is applied to the drive electrode while the common electrode remains at ground potential. The modulated signal is a high frequency alternating voltage signal alternating between zero volts and a positive or negative maximum voltage, depending on the cell state.

A problem in prior art EP cells is that should a defect occur in a circuit, an entire cell will fail to work. Furthermore, should a defect occur in a bus line, not just a single cell will fail, but many cells further along the line may fail, especially when open circuits occur. This problem limits the potential size of a display to one in which the number of fabrication defects is tolerable.

Another problem is that matrix displays which have square pixels cause diagonal lines to assume a jagged look. This is an effect of sampling, called aliasing, that is inherent in digital processing. Software techniques exist, called dithering or anti-aliasing, that make these slanted lines look smoother. Display devices frequently attempt to smooth jagged lines by varying the intensity of each pixel, but this requires a display device having gray levels.

An object of the invention is to provide an electrical circuit and busing structure which is tolerant of common defects so that fewer cells are disabled in a large display.

A further object of the invention is to provide an electrophoretic cell matrix that can smooth jagged lines.

DISCLOSURE OF INVENTION

The above objects have been achieved with a cellular display device having a matrix of display cells with a novel electrode array and a low-voltage, fault-tolerant busing scheme suitable for large scale integration circuits. A novel driving method is employed, termed "folded field", characterized by a half duty cycle, but having twice the electric field of ordinary circuitry. Fewer cells are disabled by common defects in a unique arrangement of redundant voltage setting circuits, electrodes and bus lines.

The folded field drive scheme has twice the effective electric field strength for half of the time of the conventional grounded electrode method. A periodic voltage signal is applied to a common electrode, which drives electrophoretic particles toward either the top or bottom of the cells. Cell electrodes can have either of two voltage states, with voltages corresponding to the maximum and minimum voltages of the periodic signal.

In operation, the electrophoretic particles will be drawn toward either the top or bottom of the cell in short pulsed moves. The folded field drive method is fast enough for nearly all display uses. The advantage of the method's low voltage is that many standard electronic circuit fabrication technologies, such as NMOS and thin film transistor technologies, are now available for making electrophoretic display drivers and auxiliary circuits. The method also prevents agglomeration of the pigment particles.

There are two levels of driver circuit organization for the cell matrix. There is a physical organization into circuit clusters, and an electrical organization of circuit groups. Identical voltage setting circuits are arranged in clusters under each cell. Each cluster is typically composed of four circuits. Groups of circuits, each of which sets a cell's electrodes to either of two voltage states, are disposed so that each circuit of the group is in a different cluster. Typically, each group is composed of four circuits. Different circuits of a cluster belong to different groups and set the electrodes of adjacent cells. Plural and independent defects that might knock out each circuit in a group are now required to knock out a cell, as opposed to a single "direct hit" type of defect which could previously knock off a cell by hitting a portion of a circuit or even a circuit wire.

Instead of a voting circuit that decides on the voltage for a cell electrode, electrode arrays are provided in each cell. Electrodes in an array are driven by a driver circuit group, i.e. an array corresponds electrically to a group. Electrodes in each array are pieces of conductive material electrically isolated from each other. Each circuit in a group sets its own electrode within the array under a cell to one of the voltage states. If one circuit should malfunction, the other circuits of the group will still provide a sufficient electric field for driving the display cell.

Bus lines for the display may also be made fault tolerant. Parallel data lines and parallel cell select lines, perpendicular to the data lines, conduct appropriate signals to the voltage setting circuits. Each circuit connects to a data line and a cell select line. Each of these lines is arranged like a ladder. Two identical main lines are disposed along both sides of a row or column of circuit clusters. Crosslines connect the two identical main lines at several places, like rungs. The advantage with this arrangement is that a break in a bus line will knock out at most one circuit. Several independent breaks are required to knock out a circuit group and its corresponding cell. Wafer scale integration with large displays is possible because the number of defects is now tolerable.

A grayish color for EP cells is achieved by setting two adjacent electrodes in the same array to different voltage states. The folded field drive scheme will drive particles upward above one electrode and downward above the other electrode. Swirling of material is generated in this area of the cell, creating a grayish appearance.

This gray scale effect can be used to reduce the jagged corners of traditional displays by placing the electrode arrays under the corners of cells. If neighboring arrays are set to the opposite color state, the region between them will become grayish. The pattern of the cell changes in relation to the state of the electrode arrays in its corners.

BRIEF DESCRIPTION OF THE DRAWINGS

FIG. 1 is a cross sectional view of two EP cells.

FIGS. 1a and 1b are plots of voltages applied to a common electrode for all cells and to an individual EP cell electrode.

FIG. 2 is a schematic of a voltage setting circuit of the present invention.

FIG. 3a is a top plan view of a prior art cell driver circuit in relation to an EP cell.

FIG. 3b is a top plan of a cell driver circuit cluster of the present invention in relation to an EP cell.

FIG. 3c is a top plan of a cell driver circuit group of the present invention, showing electrodes on an array in relation to an EP cell.

FIG. 4 shows a top plan view of driver circuits and bus lines of the present invention.

FIG. 5a is a top plan view for segmented electrodes in a cell of the present invention.

FIG. 5b is a top plan view for electrodes in a cell of the present invention.

FIG. 5c is a top plan view of another electrode arrangement in a cell of the present invention.

FIG. 5d is an enlargement of a cell corner of FIG. 5c.

BEST MODE FOR CARRYING OUT THE INVENTION

With reference to FIG. 1, voltage setting circuits 12 also known as drivers, are disposed on a wafer substrate 10, below an EP cell 11. In the case of thin film transistors, the substrate may be glass. In the other cases, the substrate is usually silicon. Bus lines 14, which conduct signals to voltage setting circuits 12, are also disposed on the wafer 10. These lines 14 may be any conducting material, such as metal or polycrystalline silicon. A relatively thick layer of insulating material 16, such as silicon nitride covers the circuits 12 and bus lines 14.

A metallized hole 18 connects voltage setting circuit 12 to electrode 20. When more than one electrode is present in each cell, each electrode is connected by a metallized hole to its circuit. The electrodes 20 and 22 may be any conducting material that does not corrode in the cell liquid 23.

Electrophoretic particles 24 and 26 are suspended in a liquid 23. The particles and liquid are different colors and preferably optically contrasting for easy viewing. The liquid should be sufficiently opaque so that when the particles 24 are at the bottom of the cell, they can not be seen through the liquid.

Spacers 28 completely surround each cell. The spacers are typically made of a dry-film photoresist, such as Riston, but other materials could be used. Typically they are spaced to define 60-100 rows per inch (23.6 to 39.4 rows/cm), and are about 50 microns high. A glass cover 32 with a transparent conductor layer 30 rests on top of the spacers 28. The conductor layer is a common electrode for all of the cells. What has been described to this point is known from the prior art.

In the present invention, a periodic voltage signal is supplied to common electrode 30. Cell electrodes 20 and 22 can have either of two voltage states corresponding to the maximum and minimum voltages of the periodic signal. This periodic signal may be a square wave alternating between zero and fifteen volts applied to the common or upper electrode 30, with the cell electrode 20 held at either of the two previously mentioned voltages. One case, cell electrode at minimum voltage, is shown in FIG. 1a with the electric field indicated by arrows A. The other case, cell electrode at maximum voltage, is shown in FIG. 1b with the electric field indicated by arrows B, opposite in direction to the field in FIG. 1a. Returning to FIG. 1, electric fields are created between the cell electrodes 20 and 22 and the common electrode 30, which drive the electrophoretic particles toward either the top or bottom of the cells in short pulsed moves.

For example, if the cell electrode 20 is at zero volts, then when the common electrode 30 is at fifteen volts, positively charged particles 24 will be drawn toward the bottom electrode 20. When the common electrode is at zero volts, no electric field will be present, and the particles will experience only a drag force and slow down. Particles 24 are thus driven only half the time. If the cell electrode 20 is at fifteen volts, the particles 26 will be driven toward the top electrode 30 during the times when the common electrode is at zero volts.

FIG. 2 shows a schematic of a voltage setting circuit of the present invention. A cell select transistor 40, a write enable transistor 42 and a depletion mode transistor 44 act together to control changes in the voltage state of a cell. The write enable transistor 42 is connected to a line having a clock signal. When both the write enable and select are "on", gate 48 opens and gate 56 closes to allow data into the memory 50. When one or both of the signals and their transistors are "off", gate 56 is open and gate 48 is closed to ignore other data signals.

The memory 50 comprises two cross-coupled inverters 52 and 54. The output of inverter 54 feeds back into the input of inverter 52 through gate 56 creating a bistable system. Data is admitted to the memory through gate 48 into inverter 52.

Voltage setting transistor 58 reads the state of the memory 50 by a line connected to the memory between inverter 52 and inverter 54. The voltage of the electrode is then set to either zero or fifteen volts by transistor 58 depending on the state of that memory. Data can be checked by reading the state of memory through select gate 60 and data sink 62.

The circuit can be modified to drive a liquid crystal display. Voltage setting transistor 58 is replaced by a pair of transistors that are driven by periodic waves that are 180° out of phase with each other. The circuit may also be modified for manufacturing processes other than NMOS. The modifications are well known in the semiconductor industry.

In FIG. 3a a single prior art driver circuit represented by the letter A sets the electrode voltage of a cell represented by the square overlying A. If a destructive particle or event 70 should land somewhere on circuit A the cell is disabled. Should the destructive particle or event 72 land on an edge and disable circuit A and an adjacent circuit, two cells will be disabled. The worst case occurs when particle 74 lands on a corner of a circuit. In that case four cells would be disabled. The chance of disabling a circuit can be reduced somewhat by reducing the area covered by the circuit, but even then a disabled circuit will cause a cell to not properly work.

FIG. 3b shows four identical circuits A, B, C, and D under a cell. The four circuits form a cluster. If all four circuits set a cell electrode, then destructive particle 76 landing at the corner where the four circuits meet would disable the cell. In all other cases, the cell would continue to function.

FIG. 3c shows an electrode configuration of the present invention. Four identical driver circuits represented by letters A, B, C, and D form a group that sets the electrodes 61, 63, 65, and 67 for the cell represented by the square 69. The circuits of the group are distributed to cells adjacent to cells 69. To disable a cell, all four circuits of the group would have to be disabled independently, since a particle of the size 250 to 400 microns is unlikely in a clean room environment. The probability of four independent disabling events is the fourth power of the probability for one disabling event. For example, if one in ten circuits are disabled, then an average of one in ten thousand cells are disabled.

In FIG. 4 driver circuits are indicated by rectangular dashed lines lettered A, B, C and D as in FIG. 3C. In addition the circuits have a pair of digits indicating the cell to which it sets the voltage. Cells are indicated by black squares numbered 101-103, 111-113 and 121-123. No electrodes or electrode arrays are shown in this view, only driver circuit positions and connecting bus lines for carrying circuit select signals and electrode voltages are shown. For example, circuit A22 partially sets the voltage of cell 122. Circuits A22, B11, C13, and D02 form a cluster, i.e. a physical organization, under cell 112. Each circuit in a cluster drives a different adjacent cell. Should all four circuit elements in a cluster become disabled, no cell would be disabled. Circuits A12, B12, C12, and D12 form a group, i.e. an electrical organization, that sets the voltage of cell 112. These circuits are disposed in different clusters so that there is little likelihood that a single destructive particle or event can disable all four circuits.

FIG. 4 also shows the bus network. The long vertical lines 1, 2, 3 in the figure are cell select lines, which carry circuit select signals to the circuits. The long horizontal lines 0, 1, 2 in the figure are data lines, which carry voltage signals to the circuits. The lines are numbered so that, for example, data lines 1 connect to circuits setting cells 111, 112, 113, etc. and the same way for other data lines. Cell select lines are numbered so that, for example, select lines 2 connect to circuits setting cells 102, 112, 122, etc., and the same way for other select lines.

Each bus line is arranged as a ladder. Two main lines of the same number, 1, 2, etc. are disposed on each side of the row or column they service. For example data lines 1 run just above and below clusters under cells 111, 112, 113, etc. Crosslines connect the two mainlines at numerous places, like rungs. In one embodiment, shown in FIG. 4, the crosslines pass right through clusters. A cross line 115 passes between circuits B11 and D02 and also between circuits A22 and C13.

The lines are arranged in this way so that if a break occurs in a line, at most one circuit would be disabled. Signals can go around a break by using the nearest available crossline. Only breaks in both main lines at the same places in the line can totally disable all circuitry beyond the breaks.

In FIG. 5a each electrode 80, 82, 84, and 86 for cell 91 is a piece of conductive material, which converges inwardly toward the center of the cell, but underlies the cell. For example, in FIG. 5a, electrode 80 starts near the upper left corner of cell 91, goes south toward electrode 86, makes a bend, goes east, makes another bend, and ends by going north toward the center. Electrodes 82, 84 and 86 are disposed in a similar manner but start in other corners of cell 91 and head in different directions, converging in a spiral-like pattern.

Each driver circuit represented by letters A, B, C, or D sets the voltage of its own electrode, electrode 80 being associated with circuit A, electrode 82 associated with circuit B, electrode 84 with circuit D and electrode 86 with circuit C. The electrodes are set to either of two voltages, as discussed above. No voting circuit is needed to decide which circuit will set the cell voltage, since each electrode votes with its electric field. Normally, each electrode in a cell is set to the same voltage. If only one or two electrodes are set to a particular voltage the cell may appear a grayish color.

In FIG. 5b the electrodes terminate in square pieces of conductive material 90, 92, 94 and 96 underlying cell 93, each electrode connected to its own circuit. The pieces need not terminate in squares, but in any closed curve having an area occupying at least 10% of the area directly beneath a cell.

In FIG. 5c, the electrode arrays 93, 95, 97 and 99 are placed under the corners of the cell walls that define cells 201-203, 211-213 and 221-223. Following the convention of FIG. 5a, each electrode is connected to a driver circuit at a terminal, designated by a dot, at one end of the electrode. The letters A, B, C and D indicate driver circuits from different groups connected to electrodes in different electrode arrays. Other driver circuits, not indicated on the drawing are connected to the other electrodes. When two adjacent electrode arrays are at different voltages, particles over one array will be pulled up, while particles over another will be pulled down. Swirling of particles is generated between those electrode arrays, creating a grayish appearance. Thus, when two adjacent cells are in different states, graying of the boundary between them occurs. Jagged diagonal lines are smoothed by this effect.

For example, if electrode array 93 is in a light state, and electrode arrays 95, 97 and 99 are in a dark state, the regions directly above the electrode arrays will still be light or dark according to their respective states. The corners of cells 201, 202, 211 and 212, in which electrode 93 lies, are light. The other corners, in particular, the upper right, lower left, and lower right corners of cell 212, in which electrode arrays 95, 97, and 99 lie, will be dark. However, the regions between electrode array 93 and arrays 95, 97 and 99 will be gray. In particular, the center of cell 212 will be dark gray because it is influenced by three electrode arrays which are dark and one which is light. The region between arrays 93 and 95 will also be gray, as will the region between arrays 93 and 97. The pattern of a cell changes in relation to the state of the electrode arrays in its corners. The overall effect of the graying will be to smooth the transition between light and dark regions, and thus smooth jagged appearance of the image on the display matrix.

FIG. 5d shows the corner of cells 201, 202, 211 and 212 under which lies electrode array 93. Electrode array 93 is made up of electrodes 110, 112, 114, and 116. The electrodes are usually conductive wires. Electrode array 93 lies under the corner of the cells 201, 202, 211 and 212 and is partly covered by spacer material 118 and 120. Electrode 110 starts in cell 201. The electrode 110 goes east, under spacer 120 and into cell 202. Electrode 110 then bends south, crosses under spacer 118, and enters cell 212. The electrode makes a final bend west and ends near the corner of cell 212. Electrode 112 begins in cell 202 and converges toward the corner in a manner similar to electrode 110. Electrode 112 lies in cells 202, 212 and 211. Electrodes 114 and 116 are arranged in a manner similar to electrodes 110, 112 but begin in cells 212 and 211, respectively. The configuration of electrodes is like a spiral, but may be any configuration converging toward a corner formed by a number of cells at the intervention of cell matrix rows and columns. The electrodes contribute to the electric field of the cells they lie in and create a graying of the centers of cells 201, 202, 211 and 212 whenever the adjacent arrays are not all in the same state.

While the invention has been described with reference to an EP cell matrix, the invention is applicable to other cellular flat panel displays, such as LCD panels.

I claim:

1. A method for driving electrophoretic cellular display device comprising,
   applying a periodic voltage signal to a common electrode of an electrophoretic cellular display device, said periodic voltage signal having a low voltage and a high voltage, and
   setting each cell electrode of said display device to one of two cell state non-periodic DC voltages, one of said voltages being near the low voltage of said periodic voltage signal, the other of said voltages being near the high voltage of said periodic voltage signal.
2. The method of claim 1 wherein said low voltage is zero volts.
3. The method of claim 1 wherein said high voltage is at least fifteen volts.
4. The method of claim 1 wherein said periodic voltage signal is a square wave.

* * * * *